United States Patent [19]

Malucelli et al.

[11] Patent Number: 5,574,094
[45] Date of Patent: Nov. 12, 1996

[54] POLYOLEFIN COMPOSITIONS AND PROCESS FOR THEIR PREPARATION

[75] Inventors: Decio Malucelli, Ferrara; Fausto Cocola, Turin, both of Italy; Francesco Forcucci, Königstein, Germany

[73] Assignee: Montell North America Inc., Wilmington, Del.

[21] Appl. No.: 967,891

[22] Filed: Oct. 28, 1992

[30] Foreign Application Priority Data

Oct. 31, 1991 [IT] Italy ................................ MI91A2910

[51] Int. Cl.⁶ ...................................................... C08L 1/02
[52] U.S. Cl. ............................ 525/54.3; 525/64; 524/13
[58] Field of Search ................... 524/13; 527/300; 525/64, 54.3; 264/143, 148, 118, 241, 176.1, 211.12

[56] References Cited

U.S. PATENT DOCUMENTS

| | | | |
|---|---|---|---|
| 3,857,799 | 12/1974 | Ooba et al. | 521/40 |
| 4,165,302 | 8/1979 | Armenti et al. | 524/13 |
| 4,228,116 | 10/1980 | Colombo et al. | 264/119 |
| 4,301,047 | 11/1981 | Jones | 524/13 |
| 4,352,897 | 10/1982 | Ogata et al. | 523/220 |
| 4,434,258 | 2/1984 | Schumacher et al. | 524/13 |
| 4,438,228 | 3/1984 | Schenck | 524/13 |
| 4,480,061 | 10/1984 | Coughlin et al. | 524/13 |
| 4,517,246 | 5/1985 | Matsuyama et al. | 428/403 |
| 4,559,376 | 12/1985 | Kubât et al. | 524/13 |
| 4,686,257 | 8/1987 | Mitsuno et al. | 524/13 |
| 4,687,793 | 8/1987 | Motegi et al. | 523/200 |
| 4,717,742 | 1/1988 | Beshay | 524/13 |
| 4,717,743 | 1/1988 | Wakabayashi et al. | 524/13 |
| 5,008,310 | 4/1991 | Beshay | 524/13 |
| 5,116,908 | 5/1992 | Inoue et al. | 525/193 |
| 5,164,432 | 11/1992 | Dehennau et al. | 524/13 |
| 5,206,278 | 4/1993 | Famili et al. | 524/377 |

FOREIGN PATENT DOCUMENTS 1252586  4/1989  Canada.

*Primary Examiner*—Jeffrey C. Mullis

[57] ABSTRACT

Polyolefin compositions comprising one or more crystalline polymers or copolymers of 1-olefins having Melt Index values higher that 20 g/10 min, and, dispersed in the above mentioned polymers or copolymers, a cellulosic material in the form of particles or fiber, as well as the process for the preparation of the above mentioned compositions in pelletized form and their conversion into products by way of injection molding.

1 Claim, No Drawings

POLYOLEFIN COMPOSITIONS AND PROCESS FOR THEIR PREPARATION

FIELD OF THE INVENTION

The present invention concerns compositions comprising crystalline polymers and copolymers of 1-olefins, of propylene in particular, and cellulosic materials, wood powders and fibers in particular, dispersed in the above mentioned polymers.

Moreover, the invention concerns the process for the preparation of compositions in the form of pellets, and of articles manufactured starting with the above mentioned pellets.

BACKGROUND OF THE INVENTION

Compositions based on olefin polymers, in particular crystalline polypropylene, filled with wood flour, are already known; because of their low cost and low specific weight (about 1 g/cm$^3$), these compositions manufactured in the form of thermoformed sheets, found good application possibilities in the automotive, appliance, and building industries. However, some of the physical-mechanical properties of said compositions are poor or barely satisfactory, such as in the case of dimensional stability at temperatures higher than ambient temperature, 40°–70° C. for example, which are usually required for the above mentioned applications, even for prolonged periods. Moreover, articles comprising said compositions can be obtained only by way of sheet thermoforming (previously obtained by using flat-die extruders) operating under very mild conditions (in particular at temperatures lower than 200° C.). With this technique, however, it is impossible to obtain articles with a complex form at fast molding cycles and without waste (scrap). For this purpose, one should resort to injection molding techniques with the proper molds, but said techniques would require, for the above mentioned composites, considerably more drastic operating conditions, in particular temperatures higher than 200° C., and generally ranging from 220° to 230° C., where the cellulosic phase would be subjected to significant thermodegradation, and consequently the articles would have an objectionable smell, poor appearance, and poor mechanical properties; moreover, the molding equipment and molds would be prone to damaging corrosion phenomena.

SUMMARY OF THE INVENTION

Compositions of polyolefins comprising one or more crystalline polymers or copolymers of 1-olefins having melt index higher than 20 g/10 min, and, dispersed in said polymers or copolymers, a cellulosic material in particle or fiber form.

DETAILED DESCRIPTION

It has now been found that it is possible to eliminate the above mentioned drawbacks, i.e., adopt the injection molding technique but operating at temperatures which do not exceed 200° C., thus allowing the manufacture of articles with complex shapes with rapid cycles, if the composition utilizing a cellulosic material is obtained by using polyolefins having low molecular weight values corresponding to melt flow index values (MFI at 230° C. and 2.16 Kg according to ASTM D 1238, Condition L, sometimes abbreviated herein as "MFI/L") higher than 20, preferably within the 25–1000 g/10 min range, and more preferably within the 30–400 g/10 min range.

The polymer material used for the compositions of the present invention is preferably selected from crystalline polymers and copolymers of linear or branched 1-olefins containing 2–10 carbon atoms; particularly preferred is polypropylene, and more particularly essentially isotactic polypropylene having an isotactic index $\geq$90% (% insoluble fraction in boiling n-heptane).

The above polyolefins are prepared with well known polymerization techniques using coordination catalysts, in particular the Ziegler-Natta catalysts.

Olefin polymers with high melt index values such as the ones required by the present invention, can be obtained, as it is known, by adequately reducing the molecular weight of the polyolefins by means of controlled thermodegradation processes, e.g. by way of thermomechanical treatments, optionally in the presence of radical initiators, such as organic peroxides. However, it is possible to obtain polymers with a high melt index without resorting to degradation processes, by adequately increasing the quantity of molecular weight regulator generally used in the Ziegler-Natta catalyst processes (particularly hydrogen).

The cellulosic material is preferably made up of wood powders or fibers, with a wide range of average dimensions (diameter or length), but generally from 0.01 to 5 mm, and having a bulk density of 0.05–0.3 g/cm$^3$.

The quantity of cellulosic material which can be incorporated in the compositions of the present invention can vary widely depending on the physical-mechanical performance desired from the finished products. For the above mentioned application, however, the preferred quantities are from 10 to 70% by weight with respect to the total weight of the composite material.

According to the present invention, by subjecting to extrusion mixtures of cellulosic material with a polyolefin, in particular polypropylene, having the characteristics specified above, one obtains pellets that can be converted, by way of known injection molding techniques and apparatuses, into articles with a very complex shape and having physical-mechanical characteristics superior to those of the equivalent commercial articles which are presently obtained only by sheet thermoforming (as mentioned above). In particular, the articles of the present invention have better rigidity and dimensional stability, both at ambient temperature and higher temperatures ($\geq$100° C.), as clearly shown by higher flexural modulus and HDT (Heat Distortion Temperature) values.

Moreover, during the molding phase of the articles of the present invention, the degradation phenomena of the cellulosic component are negligible or extremely contained, even when the content of said component is very high (40–70% by weight); consequently, the articles obtained possess considerably improved organoleptic characteristics (odor and color).

Finally, compared to the polypropylene/wood flour compositions presently on the market, the materials of the present invention are less sensitive to water absorption or humidity, with the consequent advantages related to storing the pellets, and the appearance of the manufactured articles.

As a whole, the good organoleptic, physical and mechanical properties, as well as the low cost of the products which are the object of the present invention favor their use in various application sectors, such as the automotive appliance and building industries, substituting not only the polypropylene/wood flour compositions available up to now, but also other materials, such as for example: acrylonitrile-butadiene-styrene polymers (ABS) or polypropylene reinforced with glass fiber, and talcum-filled polypropylene.

Moreover, it has been found, and this constitutes another object of the invention, that further improvements in the physical-mechanical and organoleptic characteristics can be obtained if the compositions contain substances which act as compatibilizing agents for the two phases, i.e., the polyolefin and the cellulosic material. Said substances can be selected from already known and available compatibilizing agents used for polyolefin and organic or inorganic fillers composites, such as for example the titanium alcoholates; esters of phosphoric, phosphorous, phosphonic and silicic acid; metallic salts and esters of aliphatic, aromatic and cycloaliphatic acids; ethylene/acrylic or methacrylic acid, ethylene/esters of acrylic or methacrylic acid, ethylene/vinyl acetate, styrene/maleic anhydride or esters, ABS, methacrylate/butadiene/styrene (MBS), styrene/acrylonitrile (SAN), butadiene/acrylonitrile copolymers; polyolefins, in particular polyethylene or polypropylene, modified by grafting with polar monomers such as for example maleic anhydride or esters, acrylic or methacrylic acids or esters, vinyl acetate, acrylonitrile, and styrene. The above compatibilizers can be added in quantities ranging from 0.1 to 10%, preferably from 0.5 to 5% by weight, with respect to the total weight of the composition.

As stated above, the compositions of the present invention can be easily manufactured in pellet form by way of extrusion and operating at temperatures not exceeding 200° C., preferably from 170° to 200° C.

Any known apparatus and technology can be used for this purpose. Particularly preferred are twin-screw co-rotating extruders, with high homogenization capability, and having strand die, and a cold-cutting device which reduces the strands to pellets.

By using known injection molding apparatuses and technologies, and operating at the above mentioned temperatures, one can obtain the desired articles utilizing the above pellets.

During the preparation of the pellets, besides the two main components (polyolefin and cellulosic material) and possibly some compatibilizing agents, one can feed into the extruder other additives, such as stabilizing agents (against heat, light, U.V.), plasticizers, pigments or dyes, antistatic and water repellant agents.

The following examples illustrate, but do not limit, the invention.

EXAMPLE 1

The apparatus used consists of a MARIS (Turin) TM 85 extruder mixer equipped with co-rotating screws, whose length is equal to 36 times the diameter of the screws.

46.5 parts by weight of polypropylene in pellet form having a MFI/L= 35 g/10 min, and isotactic index (% insoluble in boiling n-heptane)= 97%, and a mixture of 0.3 parts by weight of the antioxidant additive IRGANOX B 225 [1/1 mixture by weight of tris(2,4-di-tert-butylphenyl)phosphite and pentaerythrityl-tetrakis[-3-(3,5-di-tert-butyl-4-hydroxyphenyl)propionate] in a mixture with 3.2 parts by weight of polypropylene, are introduced at the extruder feed throat; 50 parts by weight of type "50" wood flour marketed by Joko (Salorno) are introduced at about ⅓ down the length of the extruder in the molten polymer. The wood flour used has the following characteristics:

bulk density: about 0.15 g/cm³
particle size distribution:

| diameter mm | % weight |
| --- | --- |
| >0.500 | 3 |
| 0.500–0.355 | 20 |
| 0.355–0.250 | 30 |
| 0.250–0.180 | 23 |
| 0.180–0.090 | 17 |
| <0.090 | 7 |

The internal temperature of the extruder is maintained at 180°–190° C. At the output the material is pelletized by way of cold strand cutting.

The pellets are then used to produce samples by way of injection molding at 170° C., and on said samples one determines the following: specific weight (g/cm³, ASTM D-1505), flexural modulus MEF (MPa, 23° C., ASTM D-790), and heat distortion temperature HDT (°C., 1.82 N/mm², ASTM D-648).

The relevant data are reported in the attached Table.

EXAMPLE 2

Example 1 is repeated, but in this case the polypropylene used is in the form of spherical particles having MFI/L=90 g/10 min and an isotactic index=93%.

The characteristics of the composition are reported in the attached Table.

EXAMPLE 3

Example 1 is repeated, but in this case the polypropylene used is in the form of spherical particles having MFI/L= 150 g/10 min, and an isotactic index=96%.

The characteristics of the composition are reported in the attached Table.

EXAMPLE 4

The apparatus and methods of Example 1 are used, but in this case one introduces at the throat of the extruder 45.5 parts by weight of polypropylene in pellet form having MFI/L=35 g/10 min, and isotactic index=96%, 0.3 parts by weight of IRGANOX B 225 in a mixture with 3.2 parts by weight of polypropylene, and 1 part by weight of polypropylene modified by grafting, containing about 5% by weight of maleic anhydride (compatibilizing agent).

⅓ down the length of the extruder one then introduces 50 parts by weight of type "50" wood flour.

The characteristics of the composition obtained are reported in the attached Table; comparing them with the ones of Example 1, one can see a considerable improvement in the Heat Distortion Temperature (HDT) due to the use of the compatibilizing agent.

EXAMPLE 5

Example 4 is repeated, but in this case one uses polypropylene in spherical form having a MFI/L=400 g/10 min, and isotactic index=97%.

From the characteristics reported in the Table, one can see in this case as well, an improvement in the HDT value due to the compatibilizing agent in the composition.

EXAMPLE 6 (Comparative)

Example 4 is repeated, but in this case one uses pelletized polypropylene having a MFI/L=1.8 g/10 min.

As one can see in the Table, the composition obtained possesses flexural modulus and HDT values clearly inferior to the ones obtained with polypropylene with MFI higher than 20 g/10 min, both with and without addition of compatibilizing agents. The organoleptic properties of the pellets and molded samples are also considerably worse.

EXAMPLE 7

The polypropylene used in Example 1 (MFI/L=35 g/10 min) is subjected to thermomechanical degradation at 200° C. in a MARIS TM 35 extruder, in the presence of 0.4% by weight of TRIGONOX 101 [bis(tert-butylperoxyisopropyl)benzene].

The polypropylene thus treated, having MFI/L=400 g/10 min, is then used for the preparation of the composition with wood flour, operating as described in Example 1.

The characteristics of said composition are reported in the attached Table.

| Example n. | Specific weight (g/cm$^3$) | MEF (MPa) | HDT (°C.) |
| --- | --- | --- | --- |
| 1 | 1.09 | 4200 | 120 |
| 2 | 1.09 | 4420 | 118 |
| 3 | 1.08 | 4400 | 123 |
| 4 | 1.09 | 4290 | 133 |
| 5 | 1.09 | 4520 | 133 |
| 6 comp. | 1.08 | 2770 | 96 |
| 7 | 1.09 | 4270 | 115 |

Other features, advantages and embodiments of the invention disclosed herein will be readily apparent to those exercising ordinary skill after reading the foregoing disclosure.

In this regard, while specific embodiments of the invention have been described in considerable detail, variations and modifications of these embodiments can be effected without departing from the spirit and scope of the invention as described and claimed.

We claim:

1. A polyolefin composition consisting essentially of (a) a polymer material selected from the group consisting of crystalline polymers and copolymers of 1-olefins, linear or branched, containing 2–10 carbon atoms, the melt flow index (ASTM D 1238, Condition L) of which is 25–1000 g/10 min., (b) 0.1 to 10% by weight, with respect to the total weight of the composition, of polypropylene grafted with maleic anhydride as a compatibilizing agent, and (c) wood powder, the bulk density of which is 0.05–0.3 g/cm$^3$, and the particles of which have average dimensions of 0.01–5 mm, at a concentration of 10–70% by weight of the composition.

* * * * *